United States Patent [19]
Stutt et al.

[11] 4,101,834
[45] Jul. 18, 1978

[54] METHODS AND APPARATUS FOR REJECTION OF INTERFERENCE IN A DIGITAL COMMUNICATIONS SYSTEM

[75] Inventors: Charles A. Stutt, Rexford; Richard W. Rankin, Scotia, both of N.Y.

[73] Assignee: General Electric Company, Schenectady, N.Y.

[21] Appl. No.: 722,551

[22] Filed: Sep. 13, 1976

[51] Int. Cl.$^2$ .................................................. H04L 1/00
[52] U.S. Cl. ..................................... 325/42; 340/310 A
[58] Field of Search ............................. 331/1 R, 18, 19; 178/69.1, 53; 179/15 BS, 15 BL; 325/17, 58, 63, 418, 419, 421, 41, 42, 39, 40, 43, 44, 52, 141, 143, 164; 340/167 R, 310 R, 310 A; 358/12, 13

[56] References Cited

U.S. PATENT DOCUMENTS

| | | | |
|---|---|---|---|
| 1,711,560 | 5/1929 | Espenschied et al. | 325/58 X |
| 3,848,199 | 11/1974 | Weber | 331/19 X |

*Primary Examiner*—Benedict V. Safourek
*Attorney, Agent, or Firm*—Geoffrey H. Krauss; Joseph T. Cohen; Marvin Snyder

[57] ABSTRACT

A digital communications system of the type transmitting data on a plurality of modulated FDM carriers interspersed between harmonics of a system-wide signal and utilizing a main synchronized detector at a receiving end, is immunized to signal degradation due to reception of "noise" from both the shifting of signal harmonics and the modulation sidebands of adjacent carriers into the passband of the desired communications signal during at least synchronization acquisition by methods of interference minimization including: emplacing each data carrier at a frequency mid-way between adjacent harmonics; locking the frequency of the data carrier to the system-wide signal frequency to maintain the communications frequency exactly midway between two adjacent harmonics of the latter signal; transmitting the data in digital form and modulating each data carrier at a baud essentially equal to an exact even submultiple of the system-wide potentially-interfering signal, and detecting the transmitted digitally-modulated carrier at the receiving end by use of long-time-constant bandpass filters. Similar integrating filters, having means for discharging the storage elements thereof after each baud time period as determined by a baud clock synchronized to the system-wide signal, are utilized for the main synchronized data detector.

19 Claims, 24 Drawing Figures

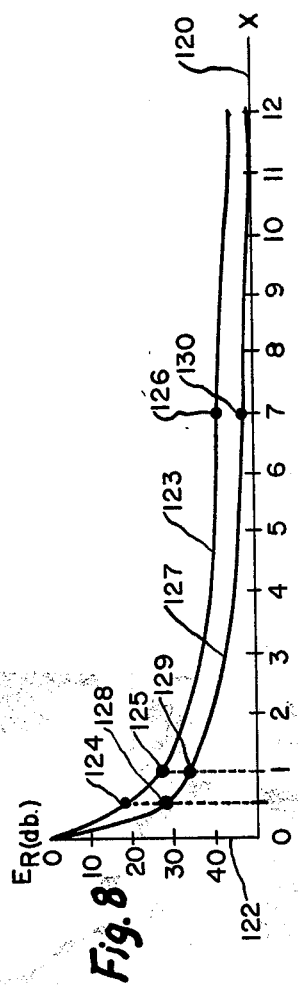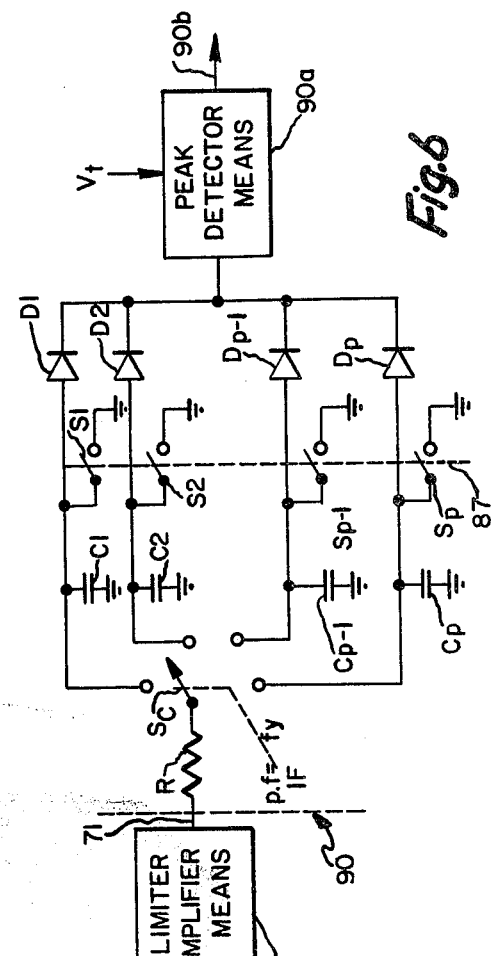

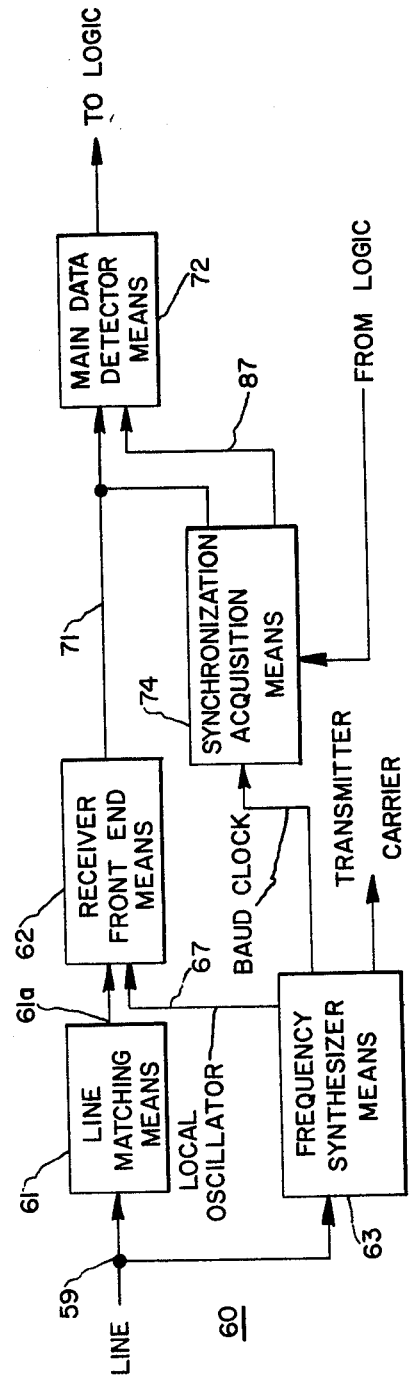

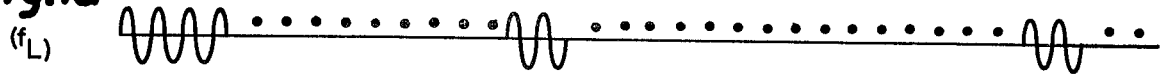
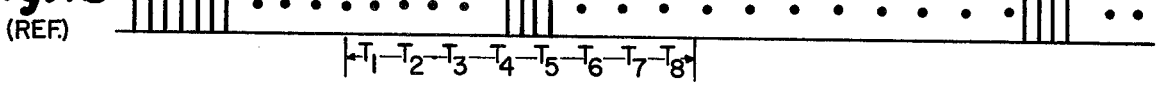
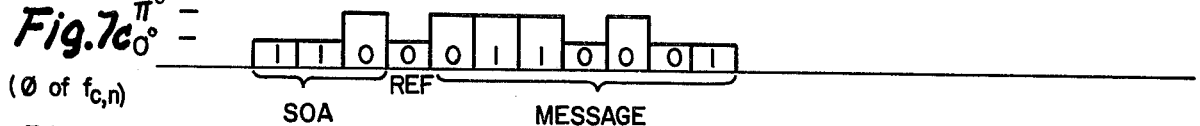
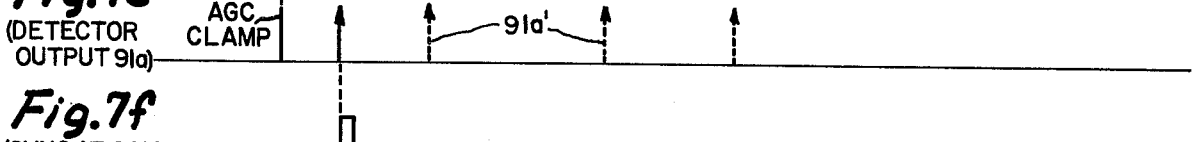
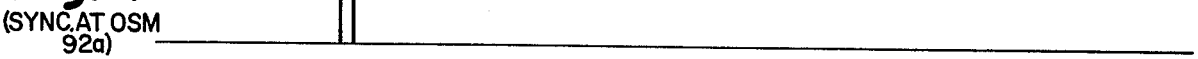
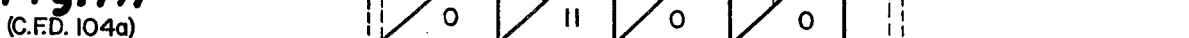

METHODS AND APPARATUS FOR REJECTION OF INTERFERENCE IN A DIGITAL COMMUNICATIONS SYSTEM

BACKGROUND OF THE INVENTION

The present invention relates to methods and apparatus for data communications and more particularly to novel methods and apparatus for the rejection of adjacent data carrier signals and potentially-interfering harmonics of a system-wide signal in a frequency-diversity-multiplex (FDM) data communications system.

Data communications systems necessarily require a high signal-to-noise ratio to assure implementation of minimal error (or "false data") rates. Frequently, such data systems operate in a hostile environment containing potentially-interfering signals which, if not suppresed by the methods utilized for transmission of data, will contribute significant magnitudes of interfering energy whereby the desired signal is lost in the "noise" generated thereby. One method known to alleviate the interference problem and, consequently, achieve a satisfactory signal-to-noise ratio, is to increase the amplitude of the transmitted signal, whereby the signal at a receiving end is sufficiently raised above the "noise" to realize relatively low error rates. In many applications, the use of a high transmitter energy is undesirable either because of the additional interference to other portions of the system or the surrounding environment from radiating transmitted energy, or because the physical characteristics of the transmission medium dictate against usage of increased power levels.

One such system, particularly adapted for use on commercial power lines (of the type carrying AC energy at a frequency in the region of 50–60 Hz.) for monitoring loads, providing load control, detecting and locating faults, providing transformer protection, automatic metering, two-way communications and the like, is described in U.S. Pat. No. 3,944,723, issued Mar. 16, 1976; U.S. Pat. No. 3,944,932, also issued Mar. 16, 1976; and allowed applications Ser. Nos. 529,998 and 529,999, filed Dec. 5, 1974, now respectively U.S. Pat. Nos. 3,973,740 and 3,973,087, both issued Aug. 3, 1976, all of which applications and patents are assigned to the assignee of the present invention and are incorporated herein by reference. At the outset, it should be understood and is most heavily emphasized that the "Power Line Access Data System" (PADS) disclosed in the four above-mentioned U.S. patents is but a single example of a data communication system to which the present invention may be applied. Any data communications system operating in a noisy environment, wherein at least some of the potentially-interfering signals are harmonically related to a system-pervasive master signal, may advantageously utilize the instant invention. In the PADS system a two-way data communication system is disclosed which utilizes power transmission lines as a transmission medium, with a multi-level "tree" system of repeaters each utilizing a plurality of carrier frequencies interspersed between harmonics of the power line frequency, for the transmission of data from one level of the "tree" to a next higher or lower level. Each carrier frequency (or "tone") is generated by an oscillator (32 or 37 of FIG. 4 of e.g., U.S. Pat. No. 3,944,723) phase locked by means of a frequency divider 34, 38 and a phase comparator 33, 36 to a submultiple of a high frequency clock signal provided by crystal oscillator. Each carrier frequency is chosen to lie approximately mid-way between a pair of sequential harmonics of the nominal line frequency, i.e. $f_{c,n} = (n + 1/2) \cdot f_{nom}$ where $f_{nom}$ is the nominal (average) line frequency, e.g. 60.000 Hz. and $f_{c,n}$ is the frequency of the carrier between the $n$-th and $(n+1)$-st harmonics of $f_{nom}$. Data is transmitted in digital format, i.e. a serial sequence of binary patterns, by on-off keying (OOK) of twelve possible tone frequencies, to present a combination of two selected tones of the twelve possible tones to signify the presence of a data bit in each part. The baud rate, i.e. bits per second, at which the digital signal is transmitted is determined by a local baud clock pulse rate derived at each individual station on the "tree" system from a station master clock 56.

Degradation of the signal-to-noise ratio occurs as the system-wide signal incrementally varies in frequency, e.g. a 60 Hz. power line frequency (having a standard stability of +0.06 Hz. maximum) and as the side bands of an adjacent keyed carrier (having the well-known (sin X)/X frequency spectrum) impinge within the relatively narrow bandpass of the system receiver.

It is desirable to utilize a synchronized main data detector means (such as the Integrate-and-Dump matched filter described at pages 275 et seq. of S. Stein and J. Jones, *Modern Communications Principles* (McGraw-Hill, 1967)) to average to zero the contributions of at least some of the potentially-interfering signals. In order to properly synchronize the main detector means, the data to be transmitted must be preceded by a synchronization sequence separately processed by unsynchronized means at the receiving end for acquiring this signal in the hostile environment. It is at the synchronization acquisition means that methods and apparatus reducing the effect of frequency shift in a system-wide signal and from the sidebands of adjacent data carriers are extremely desirable.

BRIEF SUMMARY OF THE INVENTION

In accordance with the invention, methods for the minimization of interference in a digital communication system of the type transmitting data on a plurality of modulated FDM carriers interspersed between harmonics of a system-wide signal and susceptible to signal degradation due to reception of undesired signal-like components attributable to the harmonics of the system-wide signal shifting into the passband of the desired communication signal and additionally from the modulation sidebands of adjacent carriers, comprises the steps of: emplacing each data carrier at a frequency essentially mid-way between adjacent harmonics of the system-wide signal; locking the frequency of each individual data carrier to the system-wide signal frequency to maintain the communications carrier frequency exactly mid-way between two adjacent harmonics of the latter signal; transmitting the data in digital form and modulating each data carrier in the system at a baud essentially equal to an exact even submultiple of the system-wide potentially-interfering signal; and detecting the transmitted digitally-modulated carrier at a receiving end by the use of integrating means, such as long-time-constant commutative filters, for establishing synchronization of a main data detector having means for re-initializing the detection values stored therein after each baud time period to facilitate averaging-to-zero of the interfering system-wide signals to the desired carrier frequency, which shift will generally prevent the accomplishment of the averaging-to-zero of the undesired system-wide signal harmonics. Modulation of each data carrier at an exact even submultiple of the system-wide signal frequency facilitates emplacement of the nulls of the modulation spectra of the potentially-interfering adjacent carriers within the passband of the synchronization acquisition means of a receiver tuned to the desired carrier signal frequency.

Reduction of system-wide frequency interference and adjacent carrier modulation envelope interference, respectively, on the order of 20 and 40 db. are realized, until message detector synchronization is established and even greater magnitude of interference rejection thence facilitated, by use of the novel techniques of the instant invention. Apparatus including transmitter means for generating suitable modulated data carrier signals and receiver means for reception and decoding of such signals is disclosed to facilitate implementation of the novel concepts described herein.

Accordingly, it is one object of the present invention to provide novel methods for maximization of the signal-to-noise ratio of a desired communication signal in the presence of harmonics of a system-wide signal.

It is another object of the present invention to provide novel methods for minimizing the degradation of a desired communication signal in the presence of the modulation envelope of an adjacent data carrier signal.

Another object of the present invention is to provide novel apparatus for implementing the novel interference-suppression methods disclosed.

These and other objects of the present invention will become clear to those skilled in the art on consideration of the following detailed description and drawings.

BRIEF DESCRIPTION OF THE DRAWINGS

FIGS. 1a and 1b are graphs illustrating the frequency relationships between a desired carrier signal and adjacent potentially-interfering signals in respectively a known system and a system utilizing methods in accordance with the principles of the present invention;

FIG. 3 is a block diagram of one possible embodiment of transmitter means implementing the methods in accordance with the present invention;

FIG. 4 is a block diagram of one possible embodiment of receiver means utilizable to advantage in a system in accordance with the principles of the present invention;

FIG. 6 is a block diagram of the commutating filter detectors of the receiver means of FIG. 5 and useful in understanding principles of the present invention;

FIGS. 7a–7o are a set of coordinated signal diagrams illustrating the operation of one preferred embodiment of receiver means for a particular form of modulation; and FIG. 8 is a graph illustrating the relative magnitude of the ratio of interference energy to desired carrier energy at a synchronization acquisition detector of the receiver means of FIG. 5, prior to synchronization of the main data message detector, for a range of harmonic and adjacent carrier spacings.

DETAILED DESCRIPTION OF THE INVENTION

Figure 2A:
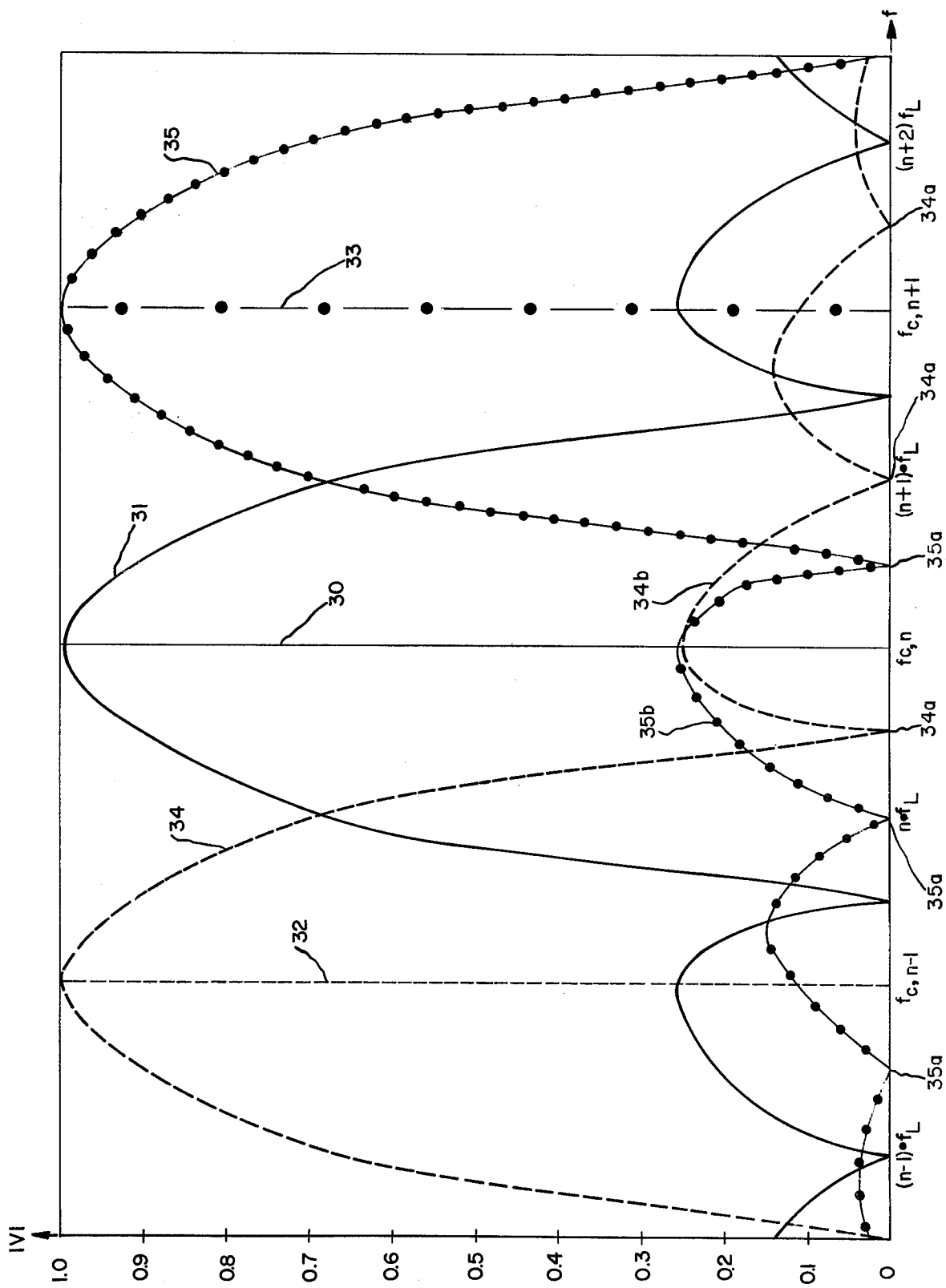
FIGS. 2a and 2b are graphs illustrating the frequency relationship of a desired data carrier interspersed between harmonics of a system-wide signal and between additional, adjacent data carriers and illustrating the manner in which interference to the desired signal by the latter-specified signals is minimized in accordance with principles of the present invention.

Reception of a carrier wave modulated by a digital data sequence may advantageously be accomplished by a receiver having a synchronized main data message detector means such as that described in block form in the aforementioned Stein and Jones text. This form of detector means, while averaging to zero the contributions of substantially all potentially-interfering signals with frequency differing from the frequency of the desired data carrier in accordance with a predetermined frequency relationship, requires that a precisely synchronized baud clock signal (for sampling, dumping of the detector elements and the like processes) be available at the start of the data message. As the message may occur at any point in time, a separate means, having its input in parallel with the input to the main data message detector, must be used for acquisition of the synchronizing signal (sync). The sync. acquisition means is itself unsynchronized and must reject all of the potentially-interfering signals to acquire the pre-data sync. to facilitate proper operation of the main data message detector means.

A first potentially-interfering signal is best illustrated by referring initially to FIG. 1a, wherein a known system (such as the PADS system disclosed in the aforementioned U.S. Patents) has an $n$-th information carrier signal 10 transmitted through media at a frequency $f_{c,n}$ and spaced between potentially-interferring adjacent signals 11 and 12, respectively, having frequencies respectively below and above the frequency of the desired carrier signal 10. In a communications system of the type being considered, potentially-interfering signals 11 and 12 have a definite mathematical relationship between their frequencies and the frequency of carrier 10; ideally, signals 11 and 12 are the $n$-th and $(n+1)$-st harmonics of a system-wide signal, such as the harmonics of the 60 Hz. power transmission frequency in a power line communications system. In one such power line transmission system, as exemplified by the disclosures of the afore-mentioned U.S. Patents, a selected one of a plurality of carrier frequencies $f_{c,n}$ is crystal controlled and is initially established with a desired frequency spacing $\Delta f_0$ from each of the adjacent power line harmonics having frequencies $f_{s,n}$ and $f_{s,n+1}$. The stability of the oscillator generating carrier 10 is essentially independent of the massive rotating generator means producing the energy on the power line and, hence, the exact frequency of each of the harmonic signals 11 and 12. Given a high degree of frequency stability of the basic system-wide frequency, potentially-interfering harmonics 11 and 12 will always lie beyond the skirts of an idealized passband 14 (indicated in broken line in FIG. 1a) at the center of which is located the desired data carrier frequency and over the range of which passband generation, transmission and reception is accomplished. Thus, considering only data carrier 10 and the adjacent harmonics 11 and 12 of the system-wide signal, a passbandwidth $BW_0$ less than $2\Delta f_0$ will prevent substantially all of the energy contained in the harmonic signals from interfering with the desired communications carrier at the synchronization acquisition detector means.

As previously mentioned hereinabove, the frequency of the system-wide signal is generally established by means essentially independent of the means generating the frequency established for data carrier 10. When the frequency of the system-wide signal is variable over some range, the harmonics thereof have correspondingly greater frequency deviations, i.e. the frequency deviation of the $n$-th harmonic being ($n$) times the frequency deviation of the primary signal, and cause signals 11 and 12 to shift frequency to an extent whereby a significant portion of their energy may be within the passband assigned to carrier signal 10. Thus, as the frequency of the system-wide signal increases, the frequency $f_{s,n}$ of its $n$-th harmonic signal 11a approaches, in the direction of arrow A, the low frequency skirt of passband 14. Similarly, for equal decreasing deviation of the frequency of the system-wide signal, the frequency $f_{s,n+1}$ of harmonic 12a decreases in frequency, in the direction of arrow B, toward the upper skirt of passband 14. As long as the frequency separation $\Delta f_1$ between the carrier frequency $f_{c,n}$ and each of the harmonic frequencies is greater than one-half the passband-width $BW_0$, a passband having suitably steep skirts will prevent any significant amount of interfering energy from appearing within the detection passband $BW_0$ associated with data carrier 10. However, larger magnitudes of increasing or decreasing deviation of the frequency of the system-wide signal, in the direction of arrows C or D, shifts the adjacent lower and upper harmonics 11b and 12b, respectively, to frequencies within passband 14, wherein each shifted harmonic 11b, 12b, respectively, has a frequency separation $\Delta f_2$, less than half the bandwidth $BW_0$ of passband 14, from carrier frequency $f_{c,n}$. Hence, synch. acquisition means having passband 14 effectively receives the total energy of the desired data communications carrier 10 along with the interfering energy of shifted harmonics 11b or 12b. As the energy amplitudes of both the desired and undesired signals may be of comparable value, large error rates in the detection of the sync. data modulating data carrier 10 undesirably occur.

Illustratively, in a PADS system having data carriers established at frequencies $f_{c,n}$ mid-way between harmonics of the 60 Hz. power line frequency, i.e. $f_{c,n} = (n \cdot f_L) + f_L/2$, one selected carrier frequency, for $n=600$, is 36030 Hz. The adjacent harmonics 11 and 12 have respective frequencies of 36000 Hz. and 36060 Hz. It is known that the stability of the power line frequency $f_L$ is of the order of 0.1%, whereby frequency shifts of 0.06 Hz. at the fundamental frequency are possible. The corresponding shifts in harmonic frequency for the respective 600th and 601st harmonics ($n=600$; $n=601$) may thus be as great as 36 Hz. As the initial frequency separation $\Delta f_0$ between carrier 10 and each adjacent harmonic 11 or 12 was only 30 Hz., it is evident that either harmonic may easily shift within any physically realizable passband 14 in which detection of data carrier 10 is to be carried out; complete breakdown of data transmission synchronization, via excessive production of errors, must subsequently occur.

Referring now to FIG. 1b, a method for essentially alleviating the problem described with reference to FIG. 1a requires that the frequency $f_{c,n}$ of a carrier signal 20 is established essentially mid-way between the frequencies of adjacent lower and upper potentially-interfering signals 21 and 22, respectively, by locking the carrier frequency $f_{c,n}$ to the frequency of the same system-wide signal generating harmonics 21 and 22. Thus, where the frequencies of the respective $n$-th and ($n+1$)-st harmonics 21 and 22 respectively are $f_{s,n} = (n \cdot f_L)$ and $f_{s,n}+1 = (n+1)f_L$, the data carrier 20 interspersed therebetween has its carrier frequency $f'_{c,n} = (n \cdot f_L) + f_L/2$, whereby the initial frequency intervals $\Delta f_0'$ between carrier 20 and each harmonic 21 and 22 are equal. As the frequency of carrier 20 is controlled by the frequency of the system-wide signal also controlling the frequency of harmonics 21 and 22, any shift in the frequency of the system-wide signal produces a corresponding shift not only in all of the harmonics thereof, but also in the frequency of each data carrier signal. Thus, as the system frequency $f_L$ increases to raise the frequency of harmonics 21a, 22a, respectively in the direction of arrows E, thus reducing the frequency difference between lower harmonic 21a and the initial frequency of carrier 20, a corresponding frequency increase in carrier 20a is effected, whereby the relative frequency separation $\Delta f_1'$ between shifted carrier 20a and shifted harmonics 21a and 22a, respectively, is maintained essentially equal both to each other and to the initial frequency spacing $\Delta f_0'$. Additional increases in the system frequency $f_L$, effecting increasing frequency (to the limits of frequency stability imposed on the system-wide signal) move harmonics 21b and 22b, respectively, in the direction of arrows F, and simultaneously cause the frequency of shifted carrier 20b to increase, whereby the frequency spacing $\Delta f_2'$ between shifted carrier 20b and each of shifted harmonics 21b and 22b, respectively, is still maintained essentially equal with respect to each shifted harmonic and to the original frequency spacing $\Delta f_0'$. Thus, if the passband in which effective synchronization (via data modulating carrier 20) is to be accomplished is somewhat less than twice the frequency spacing $\Delta f'$ (it being understood that the ideal passband 14 having perfectly vertical skirts, i.e. a shape factor of zero, is impossible to obtain in practice and that any practical bandpass will have a certain amount of adjacent harmonic energy present therein), and moves with the shifting frequency of the data carrier, then the ratio of the desired signal (carrier 20) to system-signal (harmonics 21 and 22) "noise" is maximized.

A second problem, assuming that interference to the desired communications carrier by shifting of the system-wide frequency is alleviated as hereinabove described, in caused by the modulation envelope of adjacent data carriers falling within the channel passband assigned to the particular desired data carrier under consideration.

Referring to FIG. 2a, desired carrier 30 has a modulation envelope 31 which, assuming essentially rectangular modulation in the time domain, has the known $|(\sin \pi f \tau)/(\pi f \tau)|$ modulation envelope in the frequency domain where $\tau$ is the time duration of a single pulse of transmitted carrier 30; while the modulation of any data carrier is a train of digitized data, sampled operation of a receiving end during each single pulse of a carrier, as more fully explained hereinbelow, allows this simplification of interference theory to be of significance. Assumably, a lower adjacent carrier 32 at a frequency $f_{c,n-1}$ and an upper adjacent carrier 33 at a frequency $f_{c,n+1}$, each have similar modulation envelopes 34 and 35, respectively, of the sin $x/x$ type and have the nulls 34a, 35a, respectively, thereof at frequencies offset from the carrier frequency by an amount equal to integer multiples of the reciprocal of the time interval during which each respective adjacent carrier is moudlated to its "on" condition.

As may be seen, dependent upon the baud, i.e. signaling rate, used to modulate each adjacent data carrier 32 and 33, it is probable that a lobe 34b or 35b, respectively, of each respective modulation envelope 34 (shown in broken line) or 35, (shown in chain line), will have a non-zero amplitude at the frequency $f_{c,n}$ of the desired data carrier 30. The presence of energy in lobes 34b or 35b within the passband, and especially exactly at the center frequency, of carrier 30 provides extraneous and undesirable signals which must be considered as "noise" in the detection process recovering the information impressed upon carrier 30 at a receiver end. Thus, the signal-to-noise ratio is decreased and the synchronization error rate increases, especially as modulation envelopes 34 and 35 change in amplitude in the time domain responsive to the changing bit patterns of the digital data and synchronization signals impressed upon each adjacent carrier 32, 33.

Figure 2B:
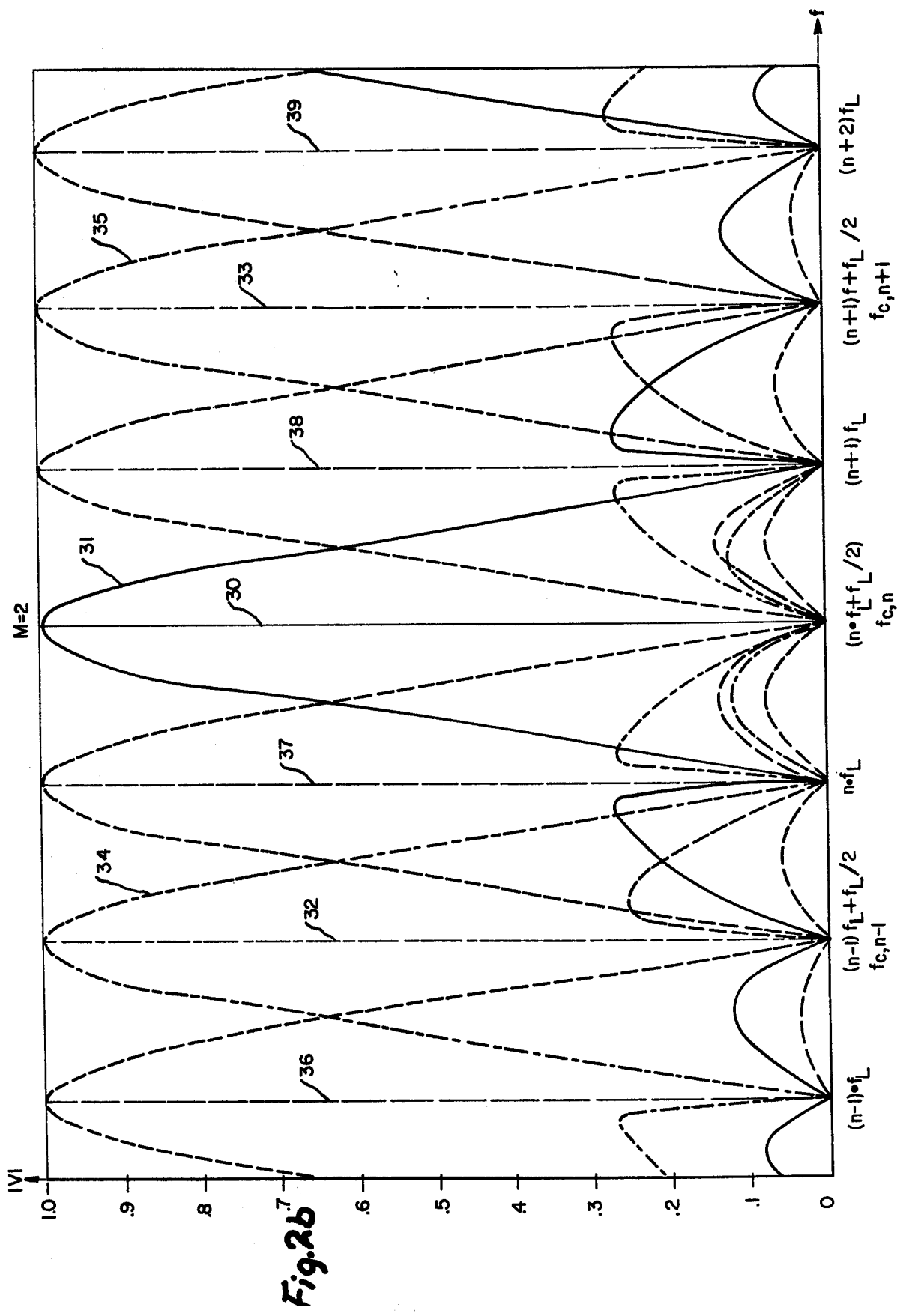

Referring now to FIG. 2b, the potentially-interfering energy from lobes of the modulation envelope of an adjacent carrier 32 or 33 and, in fact, the modulation envelope of even the adjacent harmonics 36, 37, 38, 39 of the system-wide signal, when that signal is itself gated or keyed in pulsed fashion, is illustrated.

As the frequency spacing $\Delta f$ (see FIG. 1b) between the desired carrier and each adjacent harmonic of the fundamental system-wide signal is established to be essentially constant, the closest frequency spacing between two successive data carriers is likewise established to be twice the carrier-to-harmonic spacing $(2 \cdot \Delta f)$. The sidelobes of the interfering signals (adjacent carriers) would, as hereinabove explained, normally contribute interfering energy within the passband used for transmission and reception of the desired data carrier 30. The amplitude of the interfering energy is minimized if the modulation envelope associated with each potentially-interfering signal (adjacent carrier or adjacent harmonic) is such that the envelope nulls occur essentially at a frequency $f_{c,n}$ of the desired carrier 30. As the harmonics and carriers are exactly interlaced, with a frequency spacing $f_L/2$ between adjacent carriers and harmonics, an analysis of the frequency spectra of the interfering signals, in form $(\sin \pi f\tau)/(\pi f\tau)$ yields the constraint that for a digital signal modulating a carrier to its "on" condition for baud period $\tau$, the nulls occur when $(f\tau)=m$ ($m$ being an integer) and the nulls are placed at frequencies, equal to the reciprocal of $\tau$, removed from the carrier frequency. Thus, the $m$-th null (i.e. of order $X=m$) spaced from an adjacent carrier 32, 33, ... will be essentially at the frequency of the desired carrier 30 if the baud is equal to $(1/\tau)$ where $\tau$ is the $m$-th subharmonic of the system-wide frequency $f_L$, i.e. $\tau = m/f_L$. One worst case condition occurs with a pair of adjacent data carriers having carrier separation equal to $m=1$; the modulation envelope of adjacent harmonics 37 and 38 will not have a null at the center frequency of the desired carrier and hence contributes significant interference energy in the passband thereof. Further nulls of higher order X of gated adjacent harmonics 36-39 will not coincide with the frequency of carrier 30 if $m$ is odd. Therefore, the interfering energy from adjacent carriers and harmonics is minimized for even integer values of $m$ greater than 1, whereby a null of an adjacent system-wide harmonic 37 or 38 occurs at the desired data carrier frequency and a null, of order X greater than 1, of the adjacent data carriers 32 or 33 simultaneously occurs at data carrier frequency $f_{c,n}$. Establishment of the baud to key the carrier "on" for a time period $\tau$ thus contributes minimum interference energy when the baud is established to essentially equal to a submultiple of the system-wide frequency to which each data carrier is locked, and preferably equal to an even submultiple if adjacent harmonics are gated at the baud rate or, as hereinbelow more fully explained, if long-time-constant commutative filters are utilized at a receiving end.

Referring now to FIG. 3, one embodiment of apparatus embodying the principles discussed hereinabove (with reference to FIGS. 1b and 2b) for the transmission of a data carrier maintained at essentially equal frequency spacing between two adjacent harmonics, comprises divide-by-two means 41 receiving the fundamental system-wide signal of frequency $f_L$ at its input and providing an output, at frequency $(f_L)/2$, to the reference input 42a of a phase comparator 42. The remaining input 42b of phase comparator 42 receives the frequency-scaled output, via a programmable frequency divider 43 having a division factor $(2n+1)$, of a voltage controlled oscillator (VCO) 44. The control voltage on line 45, for establishing the frequency of VCO 44, is provided at the output 42c of phase comparator 42 and is directly proportional to the phase difference between the signals appearing at reference input 42a and signal input 42b, respectively. In known manner, the carrier output frequency $f_{c,n}$ of the phase-locked-loop comprising phase comparator 42, frequency scaler 43 and VCO 44 is established at $$f_{c,n} = (2n+1)f_L/2$$

or $$f_{c,n} = (n+1/2)f_L.$$

The output of the phase-locked loop, on line 46, is fed to the signal input 47a of modulation means 47, which receives a suitable modulation signal at its modulation input 47b for producing a modulated data carrier output 47c which is coupled to the transmission media utilized by the particular communications system.

The modulating waveform at input 47b has a frequency essentially equal to an even submultiple of a system-wide frequency $f_L$. Illustratively, digitized data to be transmitted may be received in serial fashion on line 48 and be coupled to the data input 49a of a serial-shift register means 49 having a predetermined selected number of stages sufficient to accomodate the total data bits in each byte of input data. Loading of register means 49 may be accomplished by the presence of a "load next byte" signal appearing at input control terminal 49b. A divide-by-m means 50 divides the system-wide frequency $f_L$ at its input 50a by an even integer m to provide the desired subharmonic on line 51 to a clock input 52a of a type-D flip-flop 52. An inverted output 50b of means 50 is coupled to output shift control 49c of register means 49 to serially shift a next sequential bit through register means 49 and present that bit at output 49d coupled to the data input 52b of flip-flop 52. The even subharmonic of the system-wide frequency on line 51 loads each sequential bit of the data at input 52b into the flip-flop and provides an output 52c for modulating the carrier wave produced by the phase-locked-loop. The modulated carrier wave at modulation means output 47c is thence transmitted via the appropriate media to a receiving end.

In operation, the system-wide frequency $f_L$ is continuously present at transmitter input 40a and is divided by a factor of two by means 41 to lock the frequency of the carrier at input 47a of modulation means 47 to be exactly interspersed between two harmonics of the system-wide frequency. Simultaneously, the desired even submultiple of the system-wide frequency, obtained from divide-by-m means 50 is provided at opposite polarities respectively on line 51 and output 50b. When line 51 is low (binary zero) output 52c of the flip-flop is maintained at the previously established binary level, facilitating passage of the carrier through modulation means 47 with a first modulation condition and to the transmission media. During this time interval, the inverted output 50b is in a high state (binary one) whereby a first data bit of the byte of data loaded into register means 49 is shifted to output 49d and held constant thereat. Upon the inversion of the states on line 51 and output 50b, respectively, the data bit at output 49d is maintained constant thereat (output shift control 49c being configured to cause a single data bit shift only upon the rising edge of the waveform from output 50b). The presence of the logic one on line 51 and, hence, at clock input 52a allows the state of both the flip-flop output and the transmission of the carrier through modulation means 47 to be determined by the state of the data bit at remaining gate input 52b. When the logic signals on line 51 and output 50b are again reversed, a binary zero signal is present at clock input 52a to prevent loading of the changing output of the register means and inadvertent transmission of mistimed modulation. Simultaneously, the output shift control 49c receives a rising leading edge to shift the next data bit of the data byte to register means output 49b for subsequent modulation of the carrier frequency when means 50 next causes line 51 to rise to a binary one level. In this manner, the entire data byte is gated to modulation control output 47b with a baud frequency equal to an exact even submultiple of the system-wide frequency, e.g. $f_B$ (the baud frequency) being equal to $f_L/m$. Illustratively, if $f_L=60$ Hz., $n=600$ and $m=2$, a 36030 Hz. carrier is generated and is modulated at 30 baud. Hence, the nulls of the modulated carrier have a spacing to coincide with the frequencies of other data carriers, which carriers are generated by additional transmitters essentially identical to transmitter 40 and differing therefrom only in the selection of the channel number n and, possibly, the baud subharmonic number m. It should be emphasized at this point that selection of $m=2$ not only minimizes adjacent harmonic interference, as hereinabove explained for m equal to an even integer, but also allows removal of divide-by-two means 50 (line 51 being directly coupled to reference input 42a and output shift control 49c being coupled to line 51 via a logic inverter) as well as facilitating the highest data capacity in bits per second (baud frequency being inversely proportional to the value of m).

Figure 5:
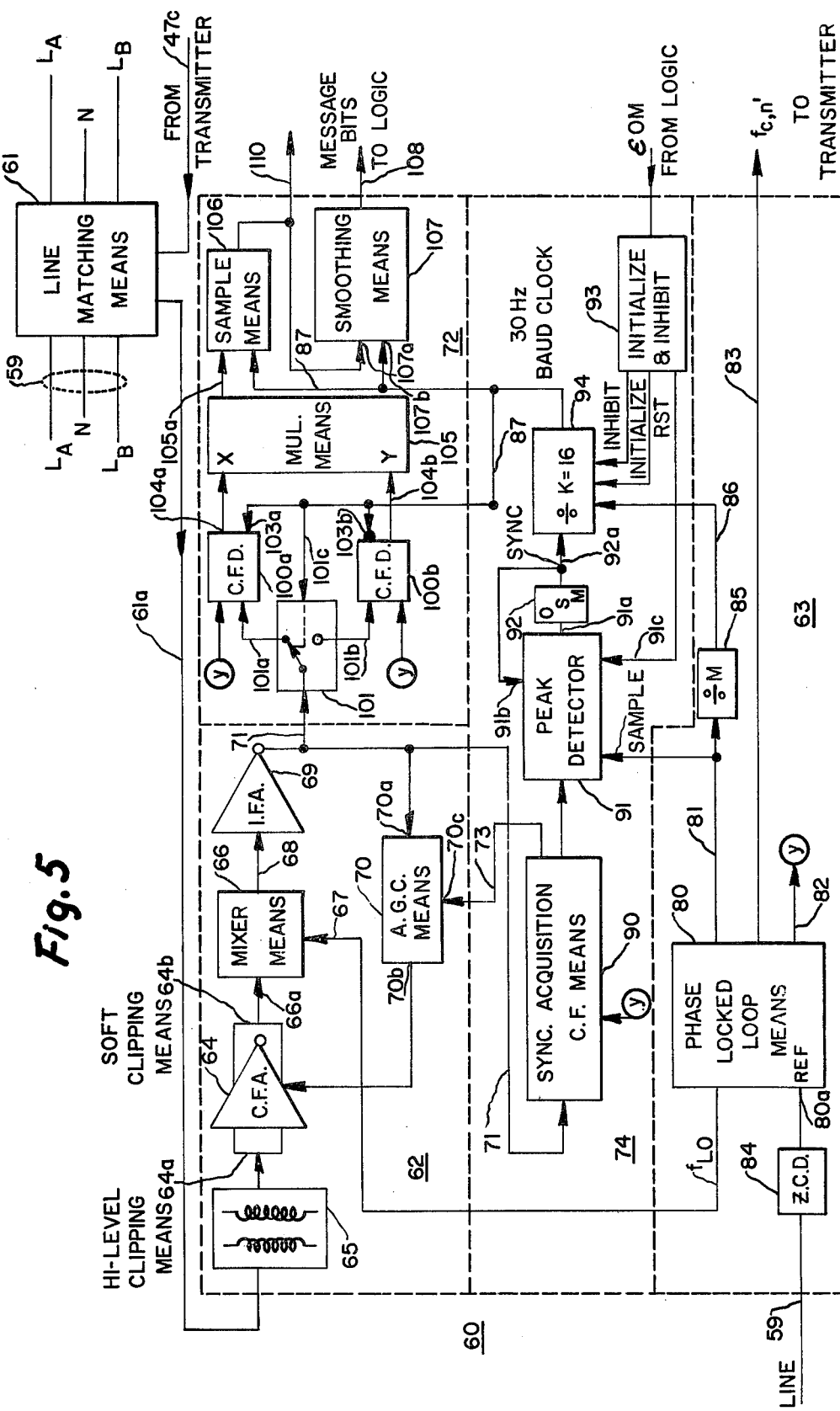
FIG. 5 is a more detailed block diagram of the receiver of FIG. 4.

A suitable receiver for reception and demodulation of a modulated carrier is shown in block diagrammatic form in FIG. 4 and in the more detailed block diagram of FIG. 5. As seen therein, the transmission medium is a power line, as in the afore-mentioned U.S. Patents. Power line 59 is coupled to receiver 60 via line matching means 61, both to provide the carrier signal to be demodulated and to provide a master reference frequency for carrying out the demodulation process in a synchronous fashion as described hereinbelow. Line matching means 61 typically comprises a coupler having a plurality of primaries in series with both energized conductors $L_A$ and $L_B$ and the neutral conductor N of a typical three-wire power transmission line. The output 61a of coupler 61 enables passage of frequencies, typically much greater than the system-wide frequency, to be coupled to receiver front end means 62. It should be understood that, during transmit, the output 47c of modulation means 47 (FIG. 3) may be directed to coupler 61 for transmission of data upon the power line media. Power line 59 is directly coupled to frequency synthesizer means 63 of the receiver. Frequency synthesizer 63 generates a multiplicity of frequencies, all phase locked to the system-wide frequency $f_L$ (the 60 Hz. line frequency, in this example).

It is desirable to approximately match the line-to-line service-drop impedance to receiver front end means 62 whereby receiver noise will never dominate line noise. As the line-to-line impedance is of the order of approximately 1-20 ohms, whereas the input impedance of a carrier-frequency amplifier (CFA) means 64 is considerably higher, a line matching transformer 65 is utilized between coupler 61 and CFA 64 for impedance matching purposes. Advantageously, line matching transformer 65 also includes a multi-stage high-pass filter to further reduce the amplitude of the power line fundamental frequency appearing at the receiver input. Typically, receiver 60 must reliably detect data carriers of approximately 5 microvolts amplitude, interlaced between harmonics of a fundamental line frequency signal having an amplitude of approximately 440 volts. Thus, the amplitude of the system-wide signal must be reduced by at least 160 db. at the input to CFA 64. The fundamental signal suppression is achieved in coupler 61, the high pass filter of line matching transformer 65 and by the inherent Q (on the order of 100) of the transformer.

Impulsive and broadband noise (non-harmonically related to the system-wide signal) may vary over a large range, typically on the order of 20-40 db. Advantageously, CFA 64 includes high-level clipping means 64a at its input to prevent random noise spikes having an amplitude greater than a preselected high-level clipping amplitude from passage into CFA 64 to prevent subsequent blocking thereof. Further, a soft-clipping means 64b prevents the amplified passband at the output of CFA 64 from exceeding another preselected amplitude.

A heterodyne receiver advantageously enables reception of a wide range of carrier frequencies with minimal redesign of receiver front end means 62 for each different band of input frequencies. Further, receiver 60 must have a high maximum gain, which could be on the order of about 120 db., and which gain may not be achieved by amplification at a single frequency, as the possibility of front end oscillation is high. Thus, only a portion of the required receiver gain is facilitated at the carrier frequency by CFA 64, with the remainder of the gain achieved at the IF frequency, whereby adequate isolation is readily achieved with known circuit layout and shielding techniques. Receiver front end means 62 therefore includes a heterodyne mixer means 66 receiving the amplitude-limited signal on line 66a from the CFA and a local oscillator signal on line 67 from frequency synthesizer 63. The output on line 68, of mixer means 66, is further amplified by an intermediate-frequency amplifier (IFA) means 69.

The amplified output from IFA 69 is coupled to an automatic gain control (AGC) means 70 and, via line 71, in parallel to both the main data detector means 72 and the synchronization acquisitions means 74. AGC means 71 is of the gated type, receiving a gating pulse on line 73 from synchronization acquisition means 74 responsive to receipt by the latter means of the IF output present on line 71, as more fully explained hereinbelow. In the normal condition, a signal of substantially zero amplitude is present at gating input 70a of AGC means 70, whereby the AGC voltage at output 70b, controlling the gain of CFA 64, is established by the broadband noise in the bandpass of IFA 69 coupled to AGC means input 70c. As hereinabove mentioned, this noise is highly variable both with time and location and requires that the maximum usable gain of receiver front end means 62 be established by adjustment of the gain of CFA 64 consistent with a predefined noise threshold value to establish a predictably constant false alarm rate. As the receiver is normally quiescent, i.e. data is not being received, and as AGC means 70 normally does not receive a signal from acquisition means 74, the normal gain of front end means 62 is essentially established by the noise received within the passband of the front end.

Receipt of a data carrier at synchronization acquisition means 74, in a manner more fully described hereinbelow, causes a gating signal to appear at gating input 70a to cause AGC means 70 to clamp its output voltage at the value immediately preceding the receipt of the data carrier and to maintain that voltage, establishing the gain of CFA 64 at the pre-message value as long as a data carrier is being received. Thus, receipt of a data signal, which usually is at a somewhat higher amplitude than the amplitude of the noise and would therefore tend to slowly increase the AGC output voltage at output 70b and hence reduce the gain of CFA 64 during the time the data carrier is present, is prevented.

Frequency synthesizer means 63 comprises a phase-locked-loop means 80 for generating a plurality of frequencies; the local oscillator frequency $f_{LO}$ carried to mixer 66 by line 67; at least one frequency at a multiple of the system-wide frequency $f_L$, present on line 81 for use in baud acquisition means 74; at least one frequency $f_Y$, present on line 82, for use in IF detection in data detector means 72; and, if a transmitter, as herein assumed, is also present at the receiving end for repeater usage or for transmission of response data via coupler 61 and the power line, another carrier frequency $f'_{c,n}$ is generated on line 83 to establish the transmitter frequency. Advantageously, frequency synthesizer means 63 utilizes a zero crossing detector 84, interposed between line 59 and the reference input 80a of phase-locked-loop means 80, to provide a phase reference having sharp leading and trailing edges at the zero crossings of the fundamental (system-wide) frequency. Preferably, for a system utilizing differential phase shift keying (DPSK) as the modulation mode, a divide-by-m means 85, receiving the signal on line 81 at its input, provides a second reference frequency, on line 86, to baud sync. acquisition means 74, for a purpose more fully described hereinbelow. It should be understood that phase-locked-loop means 80 is comprised of a plurality of phase locked loops (such as the loop including phase comparator 42, programmable frequency divider means 43 and VCO 44 of FIG. 3) which are themselves known in the art, all of the plurality of loops being locked to the system-wide frequency (or a submultiple thereof). Thus, $f_{LO}$ is equal to the difference between the carrier frequency $f_{c,n}$ and the IF frequency $f_{IF}$, which local oscillator frequency, for a data carrier at 36030 Hz. and in a receiver front end means 62 utilizing an IF frequency $f_{IF}$= 3990 Hz. is equal to 32040 Hz. (and is the 534th harmonic of the 60 Hz. system-wide frequency). Similarly, the transmitter frequency $f'_{c,n'}$ on line 83 may be established at 35610 Hz., being half the systemwide frequency plus the 593rd harmonic of the system-wide frequency, if simultaneous transmission and reception are not utilized.

As previously mentioned hereinabove, the nulls of the modulation envelopes of potentially-interfering adjacent data carriers are emplaced essentially at the frequency of the desired data carrier by modulating the data carriers at a baud rate essentially equal to an even submultiple of the system-wide frequency. A relatively narrow filter (one having a passband substantially narrower than the spacing, $f_L/2$, between a data carrier and an adjacent harmonic of the system-wide frequency) is utilized at least during system synchronization and a main data detector acts upon each baud transmitted as though that baud were the only bit of information present for all time in the system. The first criteria (narrow bandwidth filter in the synchronization channel) is met by the use of a commutating filter detector (CFD) means 90 in baud sync. acquisition means 74. The second criteria is met by sampling the output of the sync. filter and by re-initializing the main data detector means 72 after each baud period as established by sync. means 72 whereby each bit of the message is detected as if that bit were the only bit transmitted and previous bits have no effect on the detector initial conditions.

The frequency-domain operation of commutating-filter detector 90 is explained in the aforementioned U.S. Pat. No. 3,944,932, as incorporated herein by reference. Briefly, as shown in FIG. 6, the CFD receives its input on line 71 at the IF frequency from the limiter amplifier 69. The signal voltage is applied across a series circuit comprising input resistor R and each of a plurality of capacitors $C_1, C_2, \ldots, C_{p-1}, C_p$ with each capacitor being singularly sequentially coupled in series with input resistor R by commutating switch $S_c$ at a commutation frequency $f_Y$ (established on line 82) equal to the product of the number of capacitors (p) and the IF frequency. The non-common terminal of each capacitor $C_1$-$C_p$ is coupled via an associated diode $D_1$-$D_p$ to the input of a peak detector means 90a.

In operation, a signal exactly at the IF frequency is distributed to each capacitor at exactly the same point on each successive cycle, whereby the voltage on each of capacitors $C_1$-$C_p$ charges to the amplitude of the carrier wave at the associated point on its cycle, the carrier wave having substantially constant amplitude when present due to limiting amplifier 69. Conversely, a frequency at other than the IF frequency will charge each capacitor of filter 90 toward voltages differing for each rotation of commutation switch $S_c$, i.e. a different amplitude for each cycle at the non-IF frequency, whereby the voltage on each capacitor averages toward a zero amplitude during a single modulation pulse. At the desired frequency, only one of the filter capacitors charges to a highest positive voltage to cause only one of the diodes $D_1$-$D_p$ to conduct whereby that highest voltage is coupled to the input of peak detector means 90a and compare to a threshold voltage $V_n$ to enable filter output 90b if the signal is at the desired frequency. In the foregoing discussion of the frequency-domain operation of the commutating filter transmission of undesired signals therethrough is substantially prohibited by the relatively high Q and the resulting very narrow bandwidth of the filter; bandwidth is given by the expression $BW=1/(p\pi RC)$-illustratively, for p=8, C=1 microfarad and R=15 kilohms, a bandwidth of approximately 1.5 Hz. is realized.

The synchronized main data detector means 72 of FIG. 5 has a pair of CFDs 100a and 100b, respectively, each sequentially receiving the intermediate frequency signal from line 71 via a single-pole, double-throw switching means 101 having a first output 101a coupled to the signal input of CFD 100a and a second output 101b coupled to the signal input of CFD 100b, under the control of the gate signal presented to switch control input 101c. CFDs 100a and 100b are each similar to CFD 90 but include a plurality of normally-open switch means $S_1$-$S_p$, each coupled in electrical parallel connection across an associated one of the like plurality of capacitors $C_1$-$C_p$. All of switches $S_1$-$S_p$ are jointly operable to their closed condition under control of the clock signal on line 87.

In the time domain, as utilized in CFDs 100a and 100b the filter time constant $\tau_c(=1/BW$, about 0.65 seconds in the illustrative example) is sufficiently greater than the baud period (equal to 1/30 seconds or approximately 0.033 seconds for $f_L = 60$ Hz. and m=2), so that each CFD 100 can be considered as an integrator of those signals at its center frequency, with substantially complete cancellation of any signal having a frequency offset from the filter center frequency by an amount equal to an integral multiple of the reciprocal of the baud period (i.e., $F = m/\tau_B$) which advantageously is the required condition for the establishment of nulls of adjacent modulated potentially-interfering signals at the frequency of a desired data carrier. Thus, the use of a commutating filter main data detector will enhance the rejection of the potentially-interfering signals if the detector itself is reinitialized after each bit of modulation on the data carrier and thus considers only a single isolated bit of a desired modulated signal. Single pulse detector operation is facilitated by "dumping" the energy integrated in each of capacitors $C_1$-$C_p$, of detectors 100a and 100b, at the end of the integration period (equal to the baud period) by simultaneous closure of all switches $S_1$-$S_p$ responsive to a synchronized pulse on line 87. The output of each detector is sampled, immediately prior to each "dump" pulse, to extract the value of the message data bit at a time when the potentially-interfering energy has been averaged to a substantially zero amplitude. While the foregoing discussion is generally qualitative in nature, quantitative expressions for the performance of an integrate-and-dump CFD may be found in such treatises as the aforementioned Stein and Jones text.

For proper operation of the integrate-and-dump CFD, the dump pulses on line 87 must be synchronized to the baud ($F_B$ = 30 Hz.) and, for a system utilizing DPSK modulation (i.e., transmission of the carrier frequency at a first phase during a baud of a first binary value with a change to the opposite phase in a subsequent baud period only if the other binary value is to be transmitted), must be further synchronized to the baud phase at a transmitting end. As previously mentioned, this synchronization is accomplished by baud sync. acquisition means 74, comprising the baud sync. acquisition commutating filter means (BACF) 90 receiving the IF signal on line 71 at its input and having its output coupled to one input of a peak detector means 91. Peak detector 91 is of the successive peak-comparison type, utilizing the sampling signal on line 81 to determine the sample time interval, which interval is always less than a baud period.

With reference to FIG. 7, wherein a sample binary message (FIG. 7c) 0110001 is transmitted preceded by a threebit baud synchronization (start-of-message) code 110 and a fourth bit (binary 0) for phase reference purposes, the operation of baud sync. acquisition means 74 will be explained. In the frequency domain, baud sync. acquisition commutating filter means 90 provides the narrow bandpass necessary for proper rejection of adjacent carriers and harmonics, as hereinabove explained. Simultaneously, in the integrate (time-domain) mode, the presence of a data carrier at the desired frequency $f_{c,n}$ provides a voltage (FIG. 7d) which is integrated and appears as a substantially linearly charging ramp of voltage at the output of means 90 during each baud period. (The ramp is detected within means 90, when exceeding a first threshold with a selected polarity, to provide the AGC clamping signal on line 73 during the first baud period. Thus, the interference-reduction methods hereinabove described are also utilized to minimize the error rate of the commencement of AGC clamping at the reception of the start-of-message sequence, as hereinbelow set forth.)

The data frequency continues with identical phase for multiple baud periods to allow the ramp to continuously linearly charge in the direction of the previously established polarity (e.g., increasing) until reversal of the carrier modulation characteristic (Phase with the aforementioned DPSK modulation) causes each capacitor of commutating filter 90 to receive a voltage essentially identical in amplitude but of opposite polarity during a subsequent baud period whereby the capacitors are discharged and the voltage ramp at the output of means 90 substantially linearly charges with opposite polarity (e.g., decreasing). Responsive to the pulses on line 81, peak detector means 91 samples the ramp with sampling time intervals much less than a baud period; the sampling frequency $f_Z$ is an integral multiple of the system-wide frequency ($f_Z = k.f_L$, where $k$ is an integer); illustratively, k=16 and the frequency of the pulses on line 81 is 960 Hz. whereby the output of BACF means 90 is sampled $k$ (16) times per baud period. Each pair of successive samples is compared whereby the level (FIG. 7e) at detector output 91a changes when a second sample of a pair has a lesser amplitude than the immediately preceding sample. The leading edge of the level change at output 91a triggers a one-shot multivibrator (OSM) means 92 to provide a synchronizing signal (FIG. 7f) on line 92a responsive to receipt of synchronizing bits 110 at the start of each data transmission. This synchronizing signal is used to determine the proper phase for the 30 cycle baud clock on line 87, as the system-wide power line signal (at twice the baud) has four possible zero crossings at which the 30 cycle baud clock (on line 87) may be synchronized. This synchronization signal (FIG. 7f) is returned to a first reset input 91b of the peak detector means 91 to prevent extraneous synchronization pulses 97a' (FIG. 7e) from appearing during the course of a single message, due to detection of a signal having another baud sequence with a peak pattern recognizable by BACF means 90 and peak detector means 91. A second reset signal RST is received from initialization and inhibit means 93, via line 91c, responsive to logic means (not shown) providing an end-of-message (EOM) signal, whereby peak detector means 91 is always re-initialized at the end of a first message to enable baud acquisition and synchronization at the start of a subsequent data message.

The synchronization of the baud clock (FIG. 7g) to the proper zero crossing of the system-wise signal is accomplished by dividing the line 81 sampling signal, phase locked to the system-wide signal, by a factor of $m$ (the baud submultiple of the system-wide) in divide-by-$m$ means 85 to obtain a signal with frequency equal to $k$ times the baud frequency (e.g. 16.30 Hz. = 480 Hz.). This signal, on line 86, is the input to a divide-by-$k$ means 94, gated into operation by the OSM sync. output 92a after initialization to a zero-count state by the INITIALIZE output of means 93, responsive to an EOM signal after the last preceding message has ended. The output of divide-by-$k$ means 94 is the synchronized baud clock 87 and is a train of pulses having a repetition frequency $f_B$ with each pulse having a duration $\tau_S = 1/(k \cdot f_B)$. The value of $k$ is selected to be at least three times as large as the number of zero crossings of the system-wide frequency in each baud period whereby the time interval between successive pulses on input line 86 is less than a preselected synchronization time tolerance for establishment of the baud clock; the higher the value of $k$, the smaller the maximum time interval between a synchronizatin pulse from OSM 92 and the next pulse on input line 86, to reduce baud synchronization error. Thus, for a sampling frequency, on line 81, of 960 Hz., the input frequency to divide-by-$k$ means 93 is 480 Hz. for $m=2$. For a division value $k=16$, the voltage on baud clock line 73 changes state for every 16th pulse on input line 86, thereby accurately establishing the timing of the 30 Hz. baud clock for use in main data detector means 72.

In operation, for detecting the preferred DPSK modulation, the respective outputs 104a and 104b of respective CFDs 100a and 100b are of essentially zero amplitude upon receipt of the leading edge of the first baud clock pulse (FIG. 7g). Switch means 101 initially couples IF output line 71 to the first CFD input line 101a. Simultaneously therewith, the falling trailing edge of the first odd-numbered baud clock pulse generates a dump signal (FIG. 7k) at first CFD positive-triggered dump input 103a to remove all energy stored in the capacitors of CFD 100a. As previously explained hereinabove, during the first baud period $\tau_1$, the first CFD receives a carrier signal of zero phase, whereby its output 104a linearly increases in the positive direction to establish a reference polarity responsive to the receipt of the reference phase of the fourth bit of the data message. At the end of first baud period $\tau_1$ (and at the beginning of each even-numbered baud period) falling edge of each even-numbered baud clock (line 87) generates a dump signal (FIG. 7l) at second CFD negativetriggered dump input 103b to re-initialize second CFD 100b. The first CFD 100a does not receive a dump signal (receiving its dump signals only on the falling edge of each odd-numbered baud clock) and maintains the output 104a thereof at the value previously integrated. Thus, during the second baud period $\tau_2$, the output of first CFD 100a is maintained at a positive level (responsive to the receipt of a signal with zero phase in first baud period $\tau_1$) while second CFD 100b receives the data carrier signal having an opposite phase (phase of $\pi$ radians) which is integrated to generate output 104b in the opposite direction (a ramp increasing in the negative polarity direction) until the end of the second baud period. At this time, the first CFD 100a is dumped and its output 104a is re-initialized to zero, while second CFD 100b (not receiving a dump pulse at this time) maintains its output at a constant negative value indicative of the previous receipt of a carrier signal having a $\pi$ phase shift.

The integrate-and-dump process continues, whereby first CFD 100a integrates to a negative value ($\pi$ phase shift) during third baud period $\tau_3$ and integrates towards a positive value during baud periods $\tau_5$ and $\tau_7$ (zero phase shift); second CFD 100b integrates toward a negative value during baud periods $\tau_4$ and $\tau_6$ ($\pi$ phase shift) and towards a positive value during baud period $\tau_8$ (zero phase shift).

The outputs 104a and 104b from respective CFDs 100a and 100b are coupled to the respective X and Y inputs of an analog multiplier means 105. The output (FIG. 7j) of multiplier means 105 is the product of the outputs of CFDs 100a and 100b and is a train of sawtooth waveforms each having a polarity established by the product of the polarities of the "held" output of one CFD and the polarity of the integrated output of the other. Thus, during baud period $\tau_2$, the output of CFD 100a is held at a positive value while the output of CFD 100b is linearly integrating in a negative direction to generate a multiplier output 105a linearly increasing in the negative polarity direction. Similarly, during baud period $\tau_3$, both CFD outputs 104a and 104b are of negative polarity (yielding a multiplied output of positive polarity) with one CFD output linearly increasing, whereby multiplier output 105a similarly linearly increases in the positive polarity direction.

Multiplier output 105a is coupled to a first input of a sample means 106 having its remaining input 96b receiving the 30 Hz. baud clock signal on line 87. Circuitry internal to sample means 106 causes the generation of a strobe pulse (FIG. 7m) at each rising edge of the baud clock, immediately prior to the dump pulse occurring at the next baud clock edge. In this manner, the multiplier output 105a is sampled just prior to its abrupt change to an essentially zero output, whereby the output of sample means 106 is of maximized amplitude and of polarity corresponding to the polarity of the multiplier output when sampled. The output of sample means 106 is coupled to the data input 107a of smoothing means 107 having its remaining input 107b coupled to baud clock line 87. Smoothing means 107 (which may preferably be a D-type flip-flop having its data input at 107a and its clock input at 107b) forms a data output (FIG. 7n) which establishes the binary state thereof responsive to the polarity of the input receiver sample means 106 and can only change data state at a rising or trailing edge of the baud clock input 107b. Thus, the strobed value of multiplier output 105 during the second baud period $\tau_2$, is negative and, while coincident with a rising edge of the baud clock, does not provide a transition to a binary one level. The first bit 109a of data is thus a binary zero value (as originally transmitted during baud period $\tau_2$ of the input signal (FIG. 7c). Similarly, sampling of the multiplier output during the third and fourth baud periods $\tau_3$ and $\tau_4$, respectively, each produce positive signals at smoothing means input 107a to change the output states of smoothing means 107 to provide binary one data bits 109b and 109c, respectively, on line 108 to logic means (not shown) which suitably process the message bits of the incoming data. Further, sampling of the multiplier output during fifth through eighth baud periods $\tau_5$-$\tau_8$, respectively, produce signals at smoothing means first input 107a of respective negative, negative, negative, and positive values, whereby the output state of smoothing means 107 is respectively set to binary values of bits 109d-109g of 0,0,0, and 1, respectively. Thus, the original binary message bit sequence 0110001 is recovered.

Upon cessation of the message, at the end of baud period $\tau_8$, the baud clock signal on line 87 continues to appear until the multiplier output 105a presents a zero voltage which is sampled by the strobe occurring at the end of data bit 109g, to couple a zero value to the logic means via line 110. After the appearance of the new value for a preselected time duration, the logic means recognizes that the message has ended and causes the end of message (EOM) signal (FIG. 7o) to be inputted to means 93 for initialization of BACF means 90, reset of peak detector 91 and inhibition and initialization of divide-by-$k$ means 94 for subsequent acquisition of the next message to be received.

The use of transmitter means 40 and receiver means 60 as described hereinabove, utilizing the frequency interlacing, frequency stabilization and modulation frequency determination methods of the present application allow significant suppression of both the adjacent harmonics of the system-wide frequency and of adjacent data carriers during initial message acquisition; a main data detector using integrate-and-dump detectors 100 provides essentially complete rejection of all interference signals having frequencies removed from the data carrier frequency $f_{c,n}$ after sync. acquisition.

In FIG. 8, the spacing between a potentially-interfering signal is shown for multiples of order X of the system-wide frequency along abscissa 120 and the suppression of relative energy in decibels is plotted along ordinate 122 for a desired signal and a potentially-interfering signal of equal energy. A first curve 123 indicates the relative supression for receiver means 60 having a commutative filter detector, such as BACF means 90, consisting of a single commutative filter with bandwidth of approximately 2 Hz. and skirt selectively of 6 db/octave. As seen therein, an adjacent harmonic of the system-wide signal has an order $X=1/2, 3/2, \ldots, (2n+1)/2$, as each harmonic signal is spaced from the data carrier by an odd multiple of one-half the system-wide frequency. The closest adjacent harmonics ($X=1/2$) are suppressed (point 124) by approximately 18 db. It should be realized that the potentially infinite suppression illustrated in FIG. 2b is achievable only with a filter having skirts of infinite steepness, i.e., $\infty$ db./octave and that any physically realizable filter allows some amount of energy into its passband at frequencies removed from the center thereof; a desirable filter has great attenuation of all frequencies removed from the center of its passband. Additionally, it is seen that an adjacent data carrier having a frequency separation equal to the frequency of the system-wide signal, and thus of order $X=1$ (point 125), is attenuated on the order of 26 db. As previously employed hereinabove, a desirable spacing between adjacent data carriers is seven multiples of the system-wide frequency; as seen in FIG. 8, with $X=7$ (point 126) an adjacent carrier is suppressed on the order of 43 db. relative to the energy of the desired data carrier.

Even greater adjacent harmonic and adjacent data carrier suppression is achieved by the use of a two stage cummutative filter, realizing skirt selectively of the order of 12 db./octave, as shown on curve 127. The two stage, or double-tuned, integrating filter also has 3 db. bandwidth on the order of 2 Hz., but suppresses an adjacent harmonic ($X=1/2$) approximately 26 db. (point 128) and suppresses the adjacent data carriers having respective orders $X=1$ and $X=7$ (points 129 and 130, respectively) by values of approximately 32 db. and 49 db., respectively. In this manner, by proper selection of the number of integrating filter stages and of the multiples of the system-wide frequency constituting the frequency spacing between adjacent data carriers, by the aforementioned interlacing and locking techniques for emplacement of the data carrier and by the technique of locking the baud frequency to an exact submultiple of that system-wide frequency, the signal-to-noise ratio in the noise-sensitive portions of data communications systems is maximized.

While the present invention has been described with respect to one particular system of apparatus utilizing the novel methods disclosed herein, many variations and modifications of both the method and apparatus will now occur to those skilled in the art. It is our intention, therefore, to be limited solely by the appended claims and not by the specific preferred embodiments disclosed herein, it being recognized that mediums other than a commercial power line may be utilized and that many other forms of modulation may be equally as well suited for high signal-to-noise data transmission in the chosen media and its surrounding environment.

The novel subject matter for which protection of Letters Patent of the United States is desired is:

1. A method for minimizing interference to a data carrier in a data communications system having a potentially-interfering signal system-wide signal at a known frequency ($f_S$) and harmonics of said system-wide signal, comprising the steps of:

(a) generating said data carrier at a frequency ($f_C$) substantially midway between an adjacent pair of the N-th and the N+1-st harmonics of said system-wide single signal; and (b) locking the frequency ($f_C$) of said data carrier to an odd multiple (2N+1) of the first subharmonic ($f_{S/2}$) of the known frequency ($f_S$) of said single system-wide signal such that $f_C=(2N+1)(f_S/2)$, where N is an integer greater than zero, to maintain the frequency of said data carrier with essentially equal frequency seapration from each of said adjacent pair of harmonics even if said known frequency varies.

2. A method as set forth in claim 1, wherein said system further includes at least one other data carrier, said method further comprising the steps of:

(c) generating each of said at least one other data carriers at a frequency ($f_C'$) substantially mid-way between each of at least one other pair of harmonics of said known frequency and differing from the pair of harmonics adjacent to said data carrier; and (d) locking the frequency ($f_C'$) of each of said at least one other data carriers to a different odd multiple (2N'+1) of said first subharmonic of said known frequency such that each frequency $f_C=(2N'+1)(f_S/2)$, where N' is another integer greater than zero and different for each of said at least one other data carrier and differing from N for said data carrier, to maintain essentially equal frequency separation between each of said at least one other data carriers and each of the associated pair of harmonics of said known frequency even if said known frequency varies.

3. A method as set forth in claim 2, wherein step (d) comprises the steps of: dividing said known frequency by a factor of two to obtain a first subharmonic; dividing the frequency of each data carrier by a factor of (2n+1) to obtain a divided carrier frequency, where n is the number of the lower frequency harmonic adjacent to the data carrier frequency ($f_{c,n}$) comparing said first subharmonic and each divided carrier frequency to derive a frequency error for each data carrier; and adjusting the frequency of each data carrier to reduce the frequency error thereof essentially to zero.

4. A method for minimizing interference in a data communications system having a data carrier, at least one other data carrier, and a potentially-interfering system-wide signal at a known frequency, each of said data carrier and said at least one other data carrier simultaneously carrying an associated data sequence, said method comprising the steps of:
(a) generating said data carrier at a frequency substantially midway between an adjacent pair of harmonics of said system-wide signal;
(b) locking the frequency of said data carrier to the known frequency of said system-wide signal to maintain the frequency of said data carrier with essentially equal frequency separation from each of said adjacent pair of harmonics, even if said known frequency varies;
(c) generating each of said at least one other data carriers at a frequency substantially midway between each of at least one other pair of harmonics of said known frequency and differing from the pair of harmonics adjacent to said data carrier;
(d) locking the frequency of each of said at least one other data carriers to said known frequency to maintain essentially frequency separation between each of said at least one other data carriers and each of the associated pair of harmonics of said known frequency, even if said known frequency varies;
(e) digitizing each data sequence;
(f) modulating each of said data carrier and said at least one other data carrier in accordance with the associated digitized data sequence; and
(g) selecting the modulation characteristics to position a null of the modulation envelope of each modulated data carrier at the carrier frequencies of all of the remaining data carriers.

5. A method as set forth in claim 4, wherein step (g) comprises the step of generating at least one baud, each baud being essentially equal to an exact submultiple of said known frequency; and step (f) further comprises the step of advancing sequential bits of the digitized data sequence at one of said at least one baud to establish a modulation input for means modulating the associated data carrier.

6. A method as set forth in claim 5, further comprising the step of modulating each data carrier at an identical baud.

7. A method as set forth in claim 5, further comprising the step of modulating at least one of the data carriers at a baud differing from the baud utilized in modulating the remainder of said data carriers.

8. A method as set forth in claim 5, further comprising the step of establishing the baud equal to an even integral submultiple of said known frequency.

9. A method as set forth in claim 5, further comprising the steps of:
(h) receiving a selected one of said modulated data carriers at a receiving end;
(i) providing a baud clock at said receiving end;
(j) synchronizing the frequency of said baud clock to said known frequency; and
(k) demodulating said selected modulated data carrier responsive to each of a plurality of successive baud time periods, each equal to a preselected number of cycles of the frequency of said baud clock, to recover the successive values of said digitized data sequence.

10. A method as set forth in claim 9 wherein step (k) comprises the steps of: providing main data detector means at said receiving end for demulating the selected modulated data carriers; and initializing said main detector means to preselected initial conditions after each baud time period responsive to the synchronized baud clock to independently detect each baud of said selected modulated data carrier.

11. A method as set forth in claim 10, wherein said demodulating means comprises at least one integrating means and said initializing step further comprises the step of discharging said integrating means to said preselected initial conditions at the conclusion of a preselected number of said baud time periods.

12. A method as set forth in claim 9, wherein step (f) further comprises the step of preferentially reversing the phase of each data carrier in accordance with the occurrence of a first value of the associated digitized data sequence and at an associated baud equal to said exact submultiple of said known frequency; and further comprising the steps of providing a pair of said integrating means; discharging alternating ones of said pair of integrating means at the beginning of alternating ones of said baud time periods; providing means for coupling said received data carrier to alternating ones of said pairs of integrating means associated alternating ones of said baud periods, each said integrating means maintaining an output thereof at a constant value while said received data carrier is coupled to the remaining integrating means; and multiplying the outputs of said pair of integrating means together to recover the digitized data sequence.

13. A digital communications system for the transmission of data in media having a potentially-interfering system-wide signal of known frequency, said system comprising:
transmitting means including first means for generating a data carrier at a frequency essentially midway between a pair of adjacent harmonics of said known frequency;
second means responsive to said known frequency for locking the frequency of said first means exactly midway between said pair of adjacent harmonics;
third means for generating a baud essentially equal to an even integer submultiple ($m$) of said known frequency, where $m$ is greater than 1;
fourth means for storing a data sequence to be transmitted, said fourth means having an output at which sequential single bits of said data sequence are present responsive to sequential cycles of said baud;
fifth means for varying an electrical parameter of said data carrier responsive to said sequential single bits at said output of said fourth means, said fifth means having an output coupled to the transmission media of said system; and
receiving means comprising sixth means for acquiring said baud at the initiation of a data transmission of said data carrier;
seventh means for coupling said sixth means to said media; and
eighth means coupled to said seventh means for synchronously demodulating said data carrier responsive to the baud established by said sixth means.

14. A system as set forth in claim 13, wherein said first means comprises a voltage controlled oscillator having an output frequency substantially proportional to the magnitude of an input voltage; and said second means comprises first divider means for dividing said known frequency by a factor of two; second divider means for dividing the frequency of said first means by a factor of $(2n+1)$, where $n$ is an integer greater than one; and means coupled to said first and second divider means for comparing the pair of divided frequencies to derive a voltage having an amplitude substantially proportional to the frequency error between the pair of divided frequencies, said derived voltage being applied as said input voltage of said first means to reduce said frequency error essentially to zero.

15. A system as set forth in claim 13, wherein said third means comprises a frequency counter having an input and an output, said input receiving said known frequency, said output being alternatively enabled to one of first and second states during counting of each sequential group of $m$ cycles of said known frequency.

16. A system as set forth in claim 13, wherein said sixth means comprises means for integrating a received data carrier; means for generating a sampling frequency; means for sampling the integrated receive data carrier at said sampling frequency; means for detecting a change in the magnitude of said electrical parameter for sequential samples of said received data carrier; means for generating a multiple of said known frequency; and means enabled by said detecting means for dividing said multiple of said known frequency by a preselected number to generate a waveform having said baud.

17. A system as set forth in claim 16, wherein said detecting means is adapted to detect a change in polarity of the slope of said integrated received data carrier to enable said dividing means.

18. A system as set forth in claim 16, wherein the electrical parameter varied by said fifth means is the phase of said data carrier; said eighth means comprising:
 first and second integrator means each having an input and an output;
 means associated with each of said first and second integrator means for indenpendently establishing initial conditions of each integrator output responsive to different ones of the odd-numbered and even-numbered pulses of the waveform generated by said sixth means;
 switch means for alternatively coupling said seventh means to the input of one of said first and second integrator means at said baud;
 the output of each integrating means being adapted to be held constant at a value established thereat immediately prior to the remaining one of said integrator means receiving the associated initial-condition-establishing pulse and until recept of next subsequent pulse thereafter; and
 means for multiplying together the outputs of said first and second integrator means to derive a signal indicative of the phase of the data carrier received at said receiving means.

19. A system as set forth in claim 18, further comprising means for sampling the output of said multiplying means immediately prior to the receipt of each waveform edge and for storing the value of the sampled output to establish the value of each sequential bit of said data sequence.

* * * * *